United States Patent Office 3,538,217
Patented Nov. 3, 1970

3,538,217
PHENOLIC GERMICIDAL COMPOSITIONS
Norman Ellison Dewar and Said Ibrahim Razio, St. Louis, Mo., assignors to W. R. Grace & Co., New York, N.Y., a corporation of Connecticut
No Drawing. Continuation-in-part of application Ser. No. 738,854, June 21, 1968, now abandoned. This application Apr. 2, 1969, Ser. No. 812,876
Int. Cl. A61k 27/00
U.S. Cl. 424—173
9 Claims

ABSTRACT OF THE DISCLOSURE

Aqueous alkaline phenolic germicidal compositions are disclosed which contain a bactericidal phenolic component, and a solubilizing and stabilizing agent which is a sulfate of ethoxylated primary or secondary alcohol containing up to about 20 carbon atoms. Use of such sulfates provides excellent solubilization of the normally insoluble phenolic compounds at low agent to phenol weight ratios and excellent stabilization against precipitation and/or deactivation of the phenolic compounds.

---

This application for U.S. Letters Patent is a continuation-in-part of application Ser. No. 738,854, filed June 21, 1968, and now abandoned.

The present invention relates to germicidal compositions. More particularly the invention relates to aqueous alkaline phenolic germicidal compositions containing as essential ingredients a bactericidal phenolic component, and a solubilizing and stabilizing agent therefor which is chosen from a certain selected class of anionic surface active agents.

The problem of microbial or bacterial contamination is an important one since man contacts infections diseases through the spread of micro-organisms. Therefore, it is desirable that cleanser-disinfectant compositions be effective in destroying vegetative cells, including pathogenic organisms such as staphylococcus, if possible. It is well known that phenols and especially chlorinated phenols are effective germicides. It is also recognized that the chlorinated phenols are less soluble in water than the non-chlorinated compounds. Similarly, substituted chlorinated phenols having an alkyl or aralkyl group on the phenol molecule are known to have germicidal activity but such substituent reduces the solubility of the organic phenol still further, and the net result is that a difficult formulation problem exists because of their limited solubility.

In addition to the problems of water solubility mentioned above, this formulation problem is further complicated by the fact that in general phenolic germicides are less active in alkaline solutions than acid solutions. In addition, other ingredients such as inorganic salts, organic detergents, organic solubilizers, e.g., alcohol, etc. are known to have adverse effects on germicidal activity. Such effects are readily apparent by the formation of a non-homogeneous solution at use-dilution concentrations in water or by low phenol coefficients in the AOAC Phenol Coefficient test.

It is known that nonionic detergents are deactivators of phenolic germicides. This deactivation stems from the ability of phenol and phenolic derivatives to form hydrogen bonds with highly electronegative atoms such as F, O, and N. Oxygen is available in nonionic detergents in the form of an ether linkage. When phenolic compounds are mixed with a nonionic surfactant, hydrogen bonding takes place between the oxygen of the ethoxylation and the hydrogen of the hydroxyl functional group of the phenol. This type of bonding results in an adduct that has greatly diminished germicidal activity.

It has also been previously suggested to use, as phenol solubilizing agents, sodium salts of benzene-sulfonic acid, potassium salts of di-hydroxy-stearic acid, alkali salts of phenanthrene-or hydrindenesulfonic acid as well as salts of the o-hydroxy benzoic acid or of the naphthaline-sulfonic acid. Sodium or potassium salts of ricinol-sulfonic acid as well as potassium salts of ricinoleic acid have also been recommended for solubilizing phenols. All these compounds have the disadvantage that the phenol-solutions made with them are inclined to separate during cold weather or require the presence of high concentrations of the solubilizing agents. Moreover solutions made in this way do not give clear liquids when they are diluted with water.

Still further anionic surface active agents useful in phenolic disinfectant compositions are suggested in Pearson et al. U.S. Pat. 3,063,895 issued Nov. 13, 1962. The compositions disclosed in this patent contain very large proportions of detergent (surface active agent) relative to the phenol ingredients. It has now been found that highly effective aqueous alkaline phenolic antimicrobial compositions, stable to precipitation and/or deactivation of the phenol compounds, but nevertheless containing a high proportion of phenolic compounds relative to surface active agent, can be provided through the use of a special class of surface active agents as the phenol solubilizer and stabilizer.

The surface active agents (detergents) used in the practice of this invention are the sulfated ethoxylated primary or secondary alcohols most conveniently represented by the general formula:

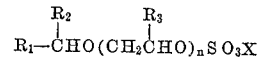

where:

$R_1$ is a hydrocarbon alkyl group containing 1 to about 20 carbon atoms and preferably about 8 to about 14 carbon atoms;
$R_2$ is hydrogen or a hydrocarbon alkyl group containing 1 to about 20 carbon atoms;
The sum of carbon atoms in $R_1$ and $R_2$ is not greater than about 20;
$R_3$ is hydrogen or methyl;
$n$ has an average value of from 0.5 to about 20; and preferably about 1 to about 9;
X is hydrogen, alkali metal, ammonium or alkylolamine, e.g., triethanolamine.

Preferably $R_3$ is hydrogen, and $n$ has an average value of from about 1 to about 9; and more desirably $n$ is 3.

It is also preferred that the $R_1R_2CHO$— moiety contain from about 9 to about 15 total carbon atoms. $R_1$ and $R_2$ may be either straight or branched chain or a mixture of both. Preferably $R_1$ is linear and, when $R_2$ is alkyl it is also preferably linear and $R_1$ and $R_2$ together contain from about 8 to about 14 carbon atoms.

In general the surface active agents used in the practice of the present invention and methods for preparing them are known to the art. They can be prepared from raw materials from a number of sources and by a variety of methods. The $RR_1CHO$— moiety could be derived from an alcohol. This alcohol could be obtained from vegetable sources or prepared by one or more synthetic processes. It is recognized that this alcohol, prepared by a synthetic process, will vary in composition and may contain linear primary alcohols, linear secondary alcohols, branched chain primary alcohols and branched chain secondary alcohols. In addition to these species, it is recognized that the chain length will vary from much less to much more than the preferred chain length. However, the average chain length will fall in the preferred range and the desired species should predominate in such mixtures.

A convenient method of preparation of this type of detergent is the reaction of an alcohol with ethylene or propylene oxide. These reactions cannot be controlled to give exact chain lengths so it is recognized that such reaction products will be mixtures with respect to the ether chain length, but the average chain length will fall within the preferred range. Sulfation of this material will result in an acidic product that may or may not be neutralized with a metal hydroxide, ammonia or an amine. This mixture will contain the preferred composition and may contain either unsulfated material, or metal or amine sulfate and unreacted base. It should not be construed that the presence or absence of unsulfated material or metal sulfate or base limits the performance of the preferred compound. It is known that low molecular weight primary or secondary alcohols are frequently used as solvents in the manufacture of detergents. The presence of such materials in the detergent should not be construed as a limitation of the invention.

A great number of the detergents useful in the present invention are listed in McCutcheon's Detergents and Emulsifiers 1966 Annual (John W. McCutcheon Inc., Morristown, N.J., 1966).

Especially preferred detergents used in the practice of the present invention are the ammonium and/or sodium salts of sulfated ethoxylated coconut fatty alcohol (Steol CS 460-Stepan Chemical Co.) or of sulfated ethoxylated linear secondary alcohols (Tergitol 15–S–3A and Tergitol 15–S–3S, Union Carbide Corporation) containing an average of about 3 ethoxy groups.

Any of the well known antimicrobial (e.g., bactericidal) phenolic compounds (including the free phenols and/or the alkali metal salts) may be used in the compositions of this invention. A considerable number of suitable halogen substituted phenols are listed in Moyle et al. U.S. Pat. 3,215,596 granted Nov. 2, 1965. Still others are described in Kirk-Othmer, Encyclopedia of Chemical Technology, 2nd Edition, vol. 2, pages 623 et seq. (1963). Most particularly preferred phenolic compounds for the compositions of this invention are ortho-benzyl-para-chlorophenol, para - tetriary - amylphenol, ortho-phenylphenol, ortho-phenyl - para - chlorophenol, and/or alkali metal salts thereof phenols, and/or mixtures of said phenols or said alkali metal salts.

The compositions of this invention contain from about 0.05 to about 1.0 part by weight, anhydrous basis, of sulfated ethoxylated surface active agent for each part by weight of the phenolic compound or compounds used for the phenolic component, calculated as the free phenol. Preferably the weight ratio of surface active agent to phenol is from about 0.1 to 0.5. The combined weight of phenolic compounds and surface active agent may range from about 0.01 up to as high as 75 percent and desirably from about 5 to about 75 percent of the total weight of the composition. Concentrated forms of the compositions of the invention may have a pH of from about 8 to about 13; usually about 12.0 to about 12.7. In normal use dilutions, wherein the active phenolic bactericides comprise 0.03 to about 0.25 percent by weight, based on total weight, the pH will range from about 8.0 to about 12.0. In most especially preferred use dilutions the concentrations of active phenolic compounds will range from about 0.05 to about 0.15 percent of the total weight resulting in a pH of from about 10.0 to about 11.2.

The key novelty of this invention resides in the high solubilizing power of alcohol sulfate detergents for phenolic derivatives at a low ethoxylated or propoxylated detergent to phenol ratio in comparison to other types of detergents, while at the same time minimizing the well known inactivation of the antimicrobial activity of phenolic derivatives by nonionic ethoxylated detergents. As a corollary point, because of the high solubilizing power of the said ethoxylated or propoxylated alcohol sulfate detergents for phenolic derivatives, high concentrates with up to 75 percent or more total solids can be manufactured with good physical stability, which is not the case with other detergents. These points of novelty are useful in that they allow economy of detergent concentration and reduction in manufacturing and shipping costs per unit produced, while maintaining a useful antibacterial product.

The invention is illustrated by the following specific examples.

EXAMPLE 1

To illustrate the difference in results obtainable with previously used non-ethoxylated anionic sulfonate detergents and with the anionic sulfated ethoxylated alcohol detergents used in the practice of the present invention, germicidal compositions having the following formulae were prepared:

| Components | Percentages | |
|---|---|---|
| | Formulation A | Formulation B |
| NaOH, 50% | 5.80 | 4.50 |
| Linear dodecyl benzene sulfonate (anhydrous) | 4.80 | |
| Sodium salt of sulfated sec-alcohol ethoxylate (anhydrous) (Tergitol 15-S-3S, Union Carbide) [1] | | 4.80 |
| o-Phenylphenol | 5.00 | 5.00 |
| p-Tertiary amylphenol | 1.00 | 1.00 |
| 4-chloro-2-phenylphenol & 6-chloro-2-phenylphenol [2] | 6.00 | 6.00 |
| Potassium sulfite ($K_2SO_3$) [3] | 1.00 | 1.00 |
| Soft water | 76.40 | 77.70 |
| Ratio of detergent to phenols | 1:2.5 | 1:2.5 |

[1] Alcohols having average of 12 carbon atoms ethoxylated with average of 3 ethoxy groups.
[2] A commercial ortho-phenyl-parachlorophenol also containing some 6-chloro isomer.
[3] Color stabilizer.

The following observations were made one each of the above compositions.

| | Formulation A | Formulation B |
|---|---|---|
| Clarity of concentrate | Clear | Clear. |
| pH of 1:128 dilution in deionized water. | 10.50 | 10.50. |
| Clarity of 1:128 in tap water | Hazy | Clear. |
| Clarity of 1:128 in tap water | Very hazy | Very slight haze. |
| Clarity of 3:128 in tap water | Translucent | Slight haze. |
| Clarity of 4:128 in tap water | Cloudy | Hazy. |
| Clarity of 5:128 in tap water | do | Do. |
| Clarity of 6:128 in tap water | do | Do. |
| Clarity of 7:128 in tap water | do | Do. |
| Clarity of 8:128 in tap water | do | Do. |
| Clarity of 9:128 in tap water | do | Do. |
| Clarity of 11:128 in tap water | do | Translucent. |
| Clarity of 23:128 in tap water | do | Cloudy. |
| Clarity of 1:128 in 300 p.p.m. hard water. | do | Clear. |
| Clarity of 1:128 in 700 p.p.m. hard water. | do | Do. |

O-Phenylphenol, chlorinated o-phenylphenol and p-tertiary amylphenol are the phenolic derivatives present in formulations A and B at identical concentrations. These compounds are water insoluble. It had previously been observed that micelles of anionic detergents, such as dodecylbenzene sulfonate, seem to solubilize these phenolic compounds provided that the ratio of phenols to detergent is 1:1. When the phenolic compounds are present at a ratio higher than 1:1, the system becomes heterogenous and the phenolic compounds will precipitate out of solution. This is the phenomenon that occurred in the use-dilution of Formulation A.

On the other hand, the use-dilution of Formulation B which is based on sulfated ethoxylated detergent surprisingly has not shown this instability. While not wishing to be bound by any theoretical explanation, it is hypothesized that an adduct is formed between equal portions of the phenolic compounds present and the sulfated, ethoxylated detergent by hydrogen bonding and that this adduct in turn acts as a solubilizer for the rest of the phenolic compounds. The solubilization was so effective that an increased water hardness up to 700 p.p.m. in the water of dilution failed to off set the effect.

EXAMPLES 2-6

The following examples show the formulae and certain properties of other compositions within the scope of the invention.

Example 2

Same as Formulation B of Example 1 except includes 8.0% by weight isopropyl alcohol and 0.2% of an odorant substituted for a portion of the water used in preparing the concentrate.

Properties:
| | |
|---|---|
| Specific gravity at 25° C. | 1.0422 |
| Lbs./gallon | 8.6721 |
| pH of 1:128 dilution in deionized water | 10.5 |
| Clarity of concentrate | Clear |
| Clarity of 1:128 dilution in 300 p.p.m. hardness water | Clear |
| Clarity of 1:128 dilution in 700 p.p.m. hardness water | Clear |
| Clarity of 1:128 dilution in tap water | Clear |
| Freeze/thaw stability (3 cycles) | OK |
| Stability at 5° C. and 50° C. (8 months) | OK |

Example 3

Same as Example 2 except that all ingredients (other than water, 1.0% potassium sulfite and 0.2% odorant) reduced 22% (to 78% of amounts in Example 2) and water increased correspondingly to provide composition having normal use dilution of 1:100.

Properties:
| | |
|---|---|
| Specific gravity at 25° C. | 1.0365 |
| Lbs./gallon | 8.6247 |
| pH of concentrate | 12.30 |
| pH of 1:100 dilution in deionized water | 10.5 |
| Solids (2 hours at 105° C.) percent | 13.00 |
| Clarity of 1:100 dilution in 300 p.p.m. hardness water | Clear |
| Clarity of 1:100 dilution in 700 p.p.m. hardness water | Very slight haze |
| Freeze/thaw stability (3 cycles) | OK |
| Stability at 5° C. and 50° C. (4 months) | OK |
| Ratio of detergent to phenols | 1:2.5 |

Example 4

The procedure of Examples 2 and 3 is repeated except the detergent, each phenol, potassium sulfite and odorant was increased to twice the amounts of Example 2 (2.56 times the amounts of Example 3); and other ingredients adjusted to following weight percent, based on total weight: NaOH (50%), 9.80%; Isopropyl alcohol, 3.0; and Soft water, 51.2.

Properties:
| | |
|---|---|
| Specific gravity at 25° C. | 1.1162 |
| Lbs./gallon | 9.2879 |
| pH of concentrate | 12.7 |
| pH of 1:256 dilution in deionized water | 10.6 |
| Clarity of 1:256 dilution in 300 p.p.m. hardness water | Clear |
| Clarity of 1:256 dilution in 700 p.p.m. hardness water | Very slight haze |
| Solids (2 hrs. at 105° C.), percent | 39.5 |
| Ratio of detergent to phenols | 1:2.50 |
| Freeze/thaw stability (3 cycles) | OK |
| Stability at 5° C. and 50° C. (8 months) | OK |

Example 5

| Formulation: | Weight percent |
|---|---|
| NaOH (50%) | 10.3 |
| Detergent (same as Example 1B) | 2.4 |
| Isopropanol | 3.0 |
| Tripropylene glycol | 3.0 |
| o-Phenylphenol | 10.0 |
| p-Tertiary amylphenol | 2.0 |
| o-Phenyl-p-chlorophenol[1] | 12.0 |
| Odorant and dye | 0.23 |
| Water | 57.07 |

[1] Also contains some 6-chloro isomer, see footnote 2, Example I.

Properties:
| | |
|---|---|
| Specific gravity at 25° C. | 1.0960 |
| Lbs./gallon | 9.1198 |
| pH of concentrate, maximum | 12.6 |
| pH of 1:256 dilution in deionized water | 10.75 |
| Clarity of 1:256 dilution in 125 p.p.m. hardness water | Clear |
| Freeze/thaw stability (3 cycles) | OK |
| Solids (2 hrs. at 105° C.), percent | 33.1 |
| Ratio of detergent to phenolics | 1:10 |
| Stability at 5° C. and 50° C. (7-8 months) | OK |

The tripropylene glycol in this formulation acts as a color change inhibitor, and was found desirable in view of the very low relative concentration of detergent.

Example 6

| Formulation: | Weight percent |
|---|---|
| NaOH (50%) | 14.0 |
| Detergent (same as previous examples) | 3.6 |
| Isopropanol | 4.5 |
| Tripropylene glycol | 4.5 |
| Triethanolamine | 3.0 |
| o-Phenylphenol | 15.0 |
| p-Tertiary amylphenol | 3.0 |
| o-Phenyl-p-chlorophenol[1] | 18.0 |
| o-Benzyl-p-chlorophenol | 0.25 |
| Odorant and dye | .35 |
| Water | 33.80 |

[1] See footnote 1, Example 5.

Properties:
| | |
|---|---|
| Specific gravity at 25° C. | 1.1347 |
| Lbs./gallon | 9.4418 |
| pH of concentrate | 12.30 |
| pH of 1:384 dilution in deionized water | 10.50 |
| Clarity of 1:384 dilution in 125 p.p.m. hardness water | Clear |
| Freeze/thaw stability (3 cycles) | OK |
| Stability at 5° C. and 50° C. (4 to 5 months) | OK |
| Solids (2 hrs. at 105° C.), percent | 53.00 |

The triethanolamine was added to this formulation to aid in low temperature stability.

The formulations of Example 2, Example 4 and Example 6 were evaluated for their effect on tile at their respective use-dilutions of 1:128, 1:256, and 1:384 and in comparison to a 2% solution of Ivory Soap. The test was performed in accordance to American Hotel Association, Spec. 1.19.2. Durometer type D, Pandux Model 307 made by Pacific Transducer Corporation was employed in determining the softening effect of the dilutions of these formulations. The following are the results of such evaluation:

| Type of tile | Untreated | Example 2 (diluted 1:128) | Example 4 (diluted 1:256) | Example 6 (diluted 1:384) | 2% Ivory Soap |
|---|---|---|---|---|---|
| Vinyl | 85.5 | 84.8 | 84.8 | 84.3 | 81.50 |
| Vinyl asbestos | 88.5 | 79.8 | 79.8 | 79.8 | 77.30 |
| Rubber | 68.5 | 66.3 | 66.3 | 66.5 | 64.50 |
| Asphalt | 88.3 | 81.3 | 81.3 | 80.5 | 77.50 |
| Linoleum | 57.8 | 46.5 | 46.5 | 45.3 | 42.50 |

The hardness of each specimen was measured using the Durometer. Three replicas of each of the above mentioned floor coverings, measuring about 2 x 4 inches were partially immersed in the solutions of the products under test for 16 hours. Then they were removed, rinsed with water and measured for hardness by the Durometer. The panels also were observed for signs of swelling, cracking, or change of appearance. All samples were compared to floor coverings soaked in a 2% solution of Ivory Soap. It is seen that all compositions tested met the requirements of the test, i.e., that they shall be no more deleterious to a flooring surface than a 2% neutral soap solution.

evaluated, in their use dilutions (1:128 and 1:256 respectively), for tuberculocidal activity by the AOAC confirmatory procedure, Official Methods of Analysis of the AOAC, Tenth Edition, 1965, Chapter 5, pp. 93–94. Each passed the test. When testing these compositions in the same manner using dilutions prepared with 1000 p.p.m. AOAC hard water both failed, whereas dilutions prepared with 400 p.p.m. AOAC hard water both passed.

The formations of Example 4 and Example 6 have been evaluated in use dilutions of 1:256 and 1:384, respectively, prepared with 1000 p.p.m. AOAC hard water against a variety of microorganisms in accordance with the AOAC use-dilution confirmation test subcultured in letheen broth with the following results:

|  | Dilution | S. aureus | Ps. aeruginosa | S. choleraesuis | T. interdigitale |
| --- | --- | --- | --- | --- | --- |
| Example 6 | 1:384 | 0/60 | 0/60 | 0/60 | 0/60 |
| Example 4 | 1:256 | 0/60 | 0/60 | 0/60 | 0/60 |

Metallic plates 7″ x 18″ were given two coats of each of the following paints and dried for 4 days:
(1) Varnish—"Valspar" gloss varnish #10 clear.
(2) Undercoat—"Central Hardware" Service—coat #102 white enamel alkyd resin—34% of vehicle (43.9% total).
(3) Lacquer—"Dupli-Color"—Auto-spray touch up—contains Pb ketones, petroleum distillate.
(4) Latex—"Glidden" spread satin — bone white #3413, ethenyl acrylate copolymer latex 100% of vehicle (65% of total).
(5) Enamel—"Master Service" high gloss #1—ultra white 100% alkyd.

After measuring the specular gloss of the painted panels, they were immersed in the use-dilution of the formulation of Examples 2, 4 and 6. Replicas of each type of paint were employed for each of the solutions. A control solution of 0.2% trisodium phosphate (anhydrous) was also used. After the panels were immersed for one hour, the specular gloss was measured again. The following are the results of loss of gloss in reflectance units:

|  | Example 2 (1:128 dilution) | Example 4 (1:256 dilution) | Example 6 (1:384 dilution) | 0.2% TSP |
| --- | --- | --- | --- | --- |
| Varnish | None | None | None | None |
| Undercoat | None | None | 2.33 | None |
| Latex | 0.33 | 1 | 0.33 | 1 |
| Enamel | None | None | 0.33 | None |
| Lacquer | None | None | None | 0.25 |

The products under testing should cause no greater decrease in gloss on a painted surface than 0.2% solution TSP. With undercoat, the formula of Example 6 shows very slightly greater loss in gloss than the control.

The compositions of Example 4 and Example 6 were evaluated for irritation potential by means of a modified Killian-Marsh Test. In the modified Killian-Marsh Test, each participant exposed one hand to the use-dilution of the new formulations of Examples 4 or 6 and the other hand to the use-dilution of similar commercially available alkaline phenolic germicide compositions. The use-dilutions were preheated to approximately 45° C. Each exposure consisted of immersing the hands in the use-dilution for one minute and drying the hands for thirty seconds by raising the hands in the air. This alternation of immersing and drying lasts for a duration of twenty minutes. The hands of the subjects were checked before and after each twenty minute test.

Three twenty minute tests were carried out by four subjects for the new formulation of Example 4 and for the new formulation of Example 6. The final results indicated no difference in irritation potential of the new germicides as compared to current similar commercial germicides.

The formulations of Example 1 and Example 5 were

EXAMPLES 7–9

Additional formulae for compositions within the scope of this invention are as follows:

|  | Weight percent | | |
| --- | --- | --- | --- |
|  | Example 7 | Example 8 | Example 9 |
| NaOH (50%) | 4.0 | 9.0 | 8.16 |
| Detergent (same as previous examples) | 4.8 | 2.4 | 1.91 |
| o-Phenylphenol | 5.0 | 10.0 | 7.97 |
| p-Tertiary amylphenol | 1.0 | 2.0 | 1.95 |
| o-Benzyl-p-chlorophenol (75%) | 6.0 | 12.0 |  |
| o-Phenyl-p-chlorophenol [1] |  |  | 9.56 |
| Tripropylene glycol | 3.0 | 3.0 | 3.00 |
| Isopropanol | 10.0 | 10.0 | 2.39 |
| Odorant | 0.2 |  |  |
| Odorant plus dyes |  | 0.23 | 0.08 |
| Water | 66.0 | 51.37 | 65.34 |

[1] Contains some 6-chloro isomer, see footnote 2, Example 1.

The formulations of Examples 7, 8 and 9 are intended for use at dilutions of 1:128; 1:256; and 1:200 respectively. The pH of a 1:200 dilution of Example 9 in deionized water is 10.75.

EXAMPLE 10

Formulation: Weight percent
Potassium sulfite _____ 1.00
Detergent (same as previous examples) _____ 6.25
NaOH (50%) _____ 3.20
o-Phenylphenol _____ 3.91
p-Tertiary amylphenol _____ 0.78
o-Phenyl-p-chlorophenol [1] _____ 5.70
Isopropanol _____ 12.00
Odorant _____ 0.20
Water _____ 66.96

[1] Contains some 6-chloro isomer, see footnote 2, Example 1.

Properties:
Specific gravity at 25° C. _____ 1.0240
Lbs./gallon _____ 8.521
pH 1:100 in distilled water _____ 10.3–10.5
Clarity in tap water at 1:100 dilution __ Slight haze
Clarity in 300 p.p.m. hardness water at 1:100 dilution _____ Slight haze
Clarity in 700 p.p.m. hardness water at 1:100 dilution _____ Hazy
Freeze/thaw stability (3 cycles) _____ OK
Stability at 5° C. (2 months) _____ OK
Stability at 50° C. (2 months) _____ OK
Solids (1 hr. at 85° C.), percent _____ 15.4–16.4
pH of concentrate _____ 12.3 max.

The formulation of Example 10 has been evaluated in use dilutions of 1:100 in distilled water and in 1000 p.p.m. AOAC hard water against a variety of microorganism in accordance with the AOAC use-dilution confirmation test with the following results:

| Microorganism | Type of water | Number of positive tubes |
|---|---|---|
| S. aureus | Distilled | 0/20 |
| S. aureus | 1,000 p.p.m | 2/20 |
| Ps. aeruginosa | Distilled | 0/20 |
| Ps. aeruginosa | 1,000 p.p.m | 1/10 |
| S. choleraesuis | Distilled | 0/20 |
| Trichophyton interdigitale | do | 0/10 |
| Trichophyton interdigitale | 1,000 p.p.m | 0/10 |

EXAMPLE 11

Formulation: Weight percent
Soft water _____ 52.56
Sodium hydroxide (50%) _____ 7.00
Detergent (same as in previous examples) __ 9.60
Potassium sulfite _____ 1.00
Isopropanol _____ 6.00
o-Phenylphenol _____ 10.00
p-Tertiary amylphenol _____ 2.00
o-Benzyl p-chlorophenol (75% in Isopropanol) _____ 11.33
Odorant and dye _____ 0.51

Properties:
Specific gravity at 25° C. _____ 1.0661
Lbs./gallon _____ 8.8452
pH 1:256 in distilled water _____ 10.5–10.7
Freeze/thaw stability (3 cycles) _____ OK
Stability 5° C. (over 2 months) _____ OK
Stability 50° C. (over 2 months) _____ OK
Clarity of 1:256 in tap water _____ Slight haze
Clarity of 1:256 in 300 p.p.m. hardness water _____ Slight haze
Clarity of 1:256 in 700 p.p.m. hardness water __ Hazy
Solids (2 hrs. with alcohol at 85° C.), percent _____ 34–35

EXAMPLES 12–13

| Formulation | Weight percent | |
|---|---|---|
| | Example 12 | Example 13 |
| NaOH (50%) | 7.5 | 7.0 |
| Detergent [1] | 9.6 | 9.6 |
| Isopropanol | 10.0 | 10.0 |
| Potassium sulfite | 2.0 | 1.0 |
| o-Phenylphenol | 10.0 | 10.0 |
| o-Benzyl-p-chlorophenol (75% in isopropanol) | 11.33 | 11.33 |
| p-Tertiary amylphenol | 2.0 | 2.0 |
| Odorant, etc | 0.5 | 0.5 |
| Water | 47.07 | 48.57 |

[1] The detergent in Example 12 is the same as used in previous Examples 1–11. The detergent in Example 13 is sulfated ethoxylated coconut fatty alcohol, sodium or ammonium salt.

The pH of a 1:256 dilution of each of the formulations of Examples 12 and 13 in distilled water is 10.5–10.7.

EXAMPLES 14–18

The formulation of Example 11 was again prepared except that the detergent, in amount indicated, was substituted with detergents having the following approximate chemical structures:

Example No.: Detergent
14 _____ $R_1CHO(CH_2CH_2O)_nSO_3Na$
wherein $R_1$ is a hydrocarbon alkyl group of about 12–13 carbon atoms, and $n$ is an average of 1.
15 _____ $R_1CHO(CH_2CH_2O)_nSO_3Na$
wherein $R_1$ is a hydrocarbon alkyl group of about 10–12 carbon atoms, and $n$ is an average of 4.
16 _____ $R_1CHO(CH_2CH_2O)_nSO_3Na$
wherein $R_1$ is a hydrocarbon alkyl group of about 14–16 carbon atoms, and $n$ is an average of 5.
17 _____ $R_1CHO(CH_2CH_2O)_nSO_3Na$
wherein $R_1$ is a hydrocarbon alkyl group of about 13–15 carbon atoms, and $n$ is an average of 6.
18 _____ $R_1CHO(CH_2CH_2O)_nSO_3Na$
wherein $R_1$ is a hydrocarbon alkyl group of about 10–12 carbon atoms, and $n$ is an average of 9.

When the formulations of Examples 14–18 are tested in accordance with the AOAC use-diluted confirmation test, similar results to those of Example 10 are experienced. The properties of these formulations approximate those of the formulation prepared in Example 11.

It is understood that the foregoing detailed description is given merely by way of illustration and that many variations may be made therein without departing from this invention.

What is claimed is:
1. An aqueous alkaline phenolic germicidal composition consisting essentially of:
    (A) a bactericidal phenolic component selected from the group consisting of ortho - benzyl-para-chlorophenol, para - tertiary - amylphenol, ortho - phenylphenol, ortho - phenyl - para chlorophenol, alkali metal salts of said phenols, and mixtures of said phenols or said alkali metal salts;
    (B) from about 0.05 to about 1.0 part by weight, anhydrous basis, for each part by weight of said phenolic component, calculated as the free phenol, of a solubilizing and stabilizing agent for said phenol, said solubilizing and stabilizing agent having the formula:

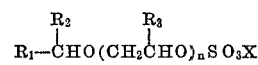

wherein $R_1$ is a hydrocarbon alkyl group containing 1 to about 20 carbon atoms; $R_2$ is hydrogen or a hydrocarbon alkyl group containing 1 to about 20 carbon atoms; the sum of carbon atoms in $R_1$ and $R_2$ is not greater than about 20; $R_3$ is hydrogen or methyl; $n$ has an average value of from 0.5 to about 20; and X is a member of the group consisting of hydrogen, alkali metal cation, ammonium cation, and triethanolamine cation; and wherein
    (C) the combined weight of (A) and (B) above is disposed in the range from about 0.01 to as high as 75 percent by weight of the total weight of the composition.

2. The composition of claim 1 having from about 0.1 to about 0.5 part by weight of solubilizing and stabilizing agent per part by weight of the phenolic component (A).

3. The composition of claim 2 wherein $R_1$ contains from about 8 to about 14 carbon atoms, and $R_2$ is hydrogen.

4. The composition of claim 3 wherein $R_3$ is hydrogen, and $n$ has an average value of from 1 to about 9.

5. The composition of claim 3 wherein $R_1R_2CHO$—is a secondary alkly radical containing about 9 to about 15 total carbon atoms; $R_3$ is hydrogen; $n$ has an average value of about 3; and X is hydrogen.

6. The composition of claim 1 in concentrated form containing about 5 to about 75 percent by weight of the total weight of the composition of said phenolic component (A) and said solubilizing and stabilizing agent (B).

7. The composition of claim 1 in diluted form suitable for direct use containing from about 0.03 to about 0.25 percent by weight, based on total weight, of said phenolic component (A) and having a pH of from about 8 to about 12.0.

8. The composition of claim 7 wherein $R_3$ is hydrogen, $R_1$ and $R_2$ together contain from about 8 to about 14 carbon atoms, $n$ has an average value of from about 1 to about 9, and X is hydrogen.

9. The composition of claim 8 containing about 0.05 to about 0.15 percent by weight of said phenolic component (A) and having a pH of from about 10.0 to about 11.2.

References Cited

UNITED STATES PATENTS

| | | | |
|---|---|---|---|
| 2,191,405 | 2/1940 | Hueter et al. | 424—348 |
| 2,874,087 | 2/1959 | Obladen et al. | 424—346 |
| 3,063,895 | 11/1962 | Pearson et al. | 424—347 |
| 3,155,568 | 11/1964 | Surgant et al. | 424—175 |
| 3,223,643 | 12/1965 | Law | 252—106 |
| 3,224,976 | 12/1965 | Farrar et al. | 252—106 |

ALBERT T. MEYERS, Primary Examiner

D. M. STEPHENS, Assistant Examiner

U.S. Cl. X.R.

252—106; 424—175, 346, 347

PO-1050
(5/69)

UNITED STATES PATENT OFFICE
CERTIFICATE OF CORRECTION

Patent No. 3,538,217          Dated    Nov. 3, 1970

Inventor(s)   Norman E. Dewar and Said I. Raziq

It is certified that error appears in the above-identified patent and that said Letters Patent are hereby corrected as shown below:

Inventor's last name reading "Razio" should correctly read --Raziq--.

SIGNED AND
SEALED
JAN 19 1971

(SEAL)
Attest:

Edward M. Fletcher, Jr.
Attesting Officer

WILLIAM E. SCHUYLER, JR
Commissioner of Patents